United States Patent [19]
Baker

[11] Patent Number: 5,185,836
[45] Date of Patent: Feb. 9, 1993

[54] OPTICAL FIBRE COUPLINGS

[75] Inventor: Peter D. Baker, Basingstoke, England

[73] Assignee: Smiths Industries Public Limited Company, London, England

[21] Appl. No.: 827,351

[22] Filed: Jan. 29, 1992

[30] Foreign Application Priority Data

Feb. 8, 1991 [GB] United Kingdom ............... 9102715

[51] Int. Cl.⁵ .............................................. G02B 6/38
[52] U.S. Cl. ........................................ 385/61; 385/33
[58] Field of Search ................ 385/33, 61, 73, 74, 385/79

[56] References Cited

U.S. PATENT DOCUMENTS

| | | | |
|---|---|---|---|
| 4,304,461 | 12/1981 | Stewart et al. .................. | 385/74 |
| 4,497,536 | 2/1985 | Payne et al. .................. | 350/96.21 |
| 4,632,505 | 12/1986 | Allsworth .................... | 385/74 |
| 4,844,580 | 7/1989 | Lynch et al. .................. | 350/96.18 |
| 4,854,663 | 8/1989 | Borsuk et al. ................. | 350/96.20 |
| 4,898,450 | 2/1990 | Jannson et al. ................ | 350/96.21 |
| 4,925,267 | 5/1990 | Plummer et al. ............... | 350/96.20 |

FOREIGN PATENT DOCUMENTS 0330728 9/1989 European Pat. Off. .
2241349 8/1991 United Kingdom ................. 385/33

Primary Examiner—John D. Lee
Assistant Examiner—John Ngo
Attorney, Agent, or Firm—Pollock, VandeSande and Priddy

[57] ABSTRACT

A coupling between two optical fibre cables has a ceramic ferrule at the end of each cable through which its fibre projects. Each fibre is melted into a spherical termination which sits in a frusto-conical recess at the end of the ferrule. A layer of a transparent resilient adhesive lies between the termination and the recess. The ferrules extend respectively into recesses at opposite ends of a ceramic tube which has a passageway coated with a reflecting layer so that radiation from one cable is focussed by its termination on the termination of the other cable and stray radiation is reflected by the reflecting layer.

10 Claims, 1 Drawing Sheet

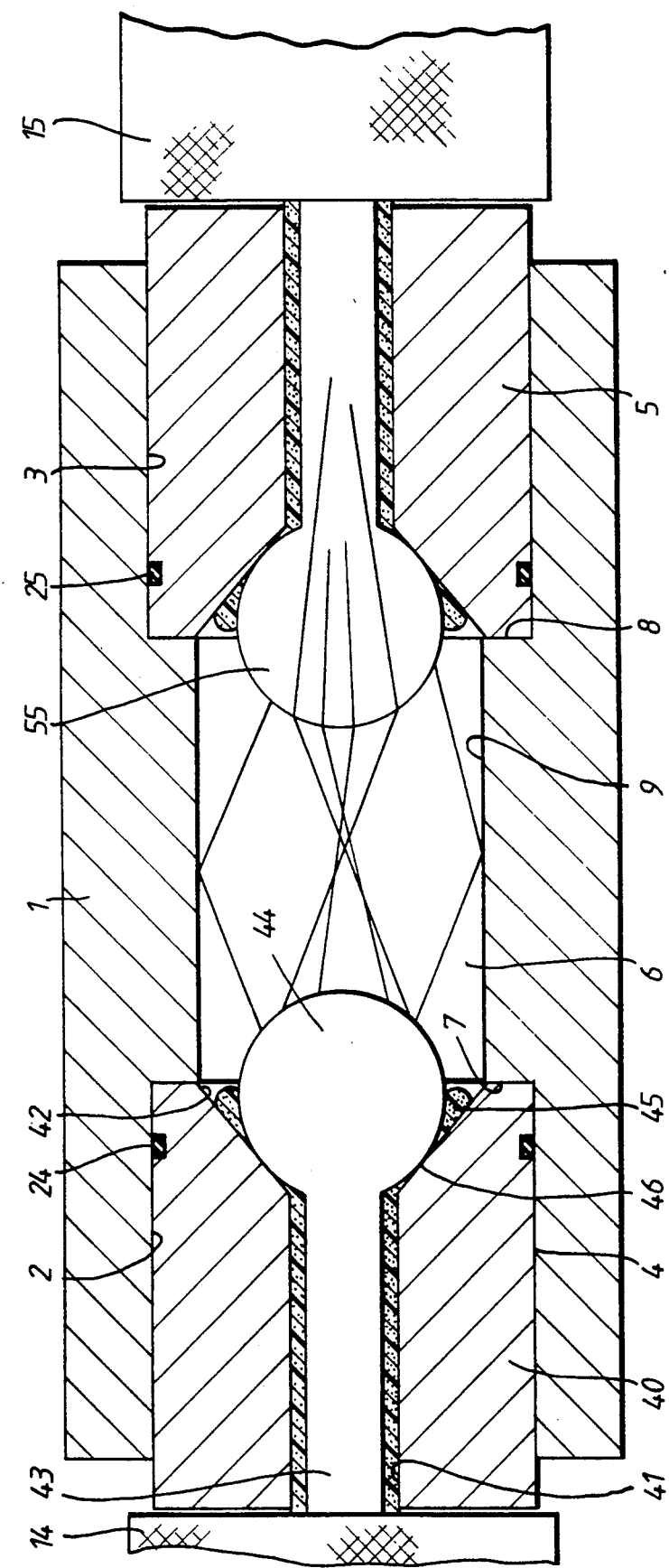

OPTICAL FIBRE COUPLINGS

BACKGROUND OF THE INVENTION

This invention relates to optical fibre couplings.

Optical fibres are increasingly being used for the transmission of data. Critical to the performance of systems including optical fibres is the performance of couplings used in the systems. It is important that the loss introduced by the couplings be as low as possible since otherwise there will be a reduction in the signal-to-noise ratio. Any loss caused by the coupling should preferably remain constant and not vary with vibration, change in temperature or the like. The losses should also be predictable and repeatable between different couplings so that the need to recalibrate when changing a coupling is reduced. Where the couplings are used in environments subject to high temperature or vibration, the coupling must be capable of withstanding the environment without damage. It is also important that the couplings be easy to manufacture accurately at low cost and that they can be readily cleaned.

BRIEF SUMMARY OF THE INVENTION

It is an object of the present invention to provide an improved optical fibre coupling.

According to the present invention there is provided a coupling for interconnecting a first and second optical fibre, each said fibre being provided with an enlarged termination of substantially spherical shape, the coupling including first and second tubular support members each having a bore through which extends a respective one of the optical fibres, the bore of each support member opening into a respective enlarged recess that flares outwardly towards the end of the support member and in which is seated a respective one of the enlarged terminations, each support member having a layer of resilient material intermediate the recess and the termination, the support members being aligned with one another at opposite ends of a tubular passageway having a reflective surface, and the terminations facing one another such that radiation transmitted from one optical fibre is focussed by its termination into the termination of the other optical fibre.

The recesses may be of frusto-conical shape and the resilient material is preferably a transparent adhesive with a lower refractive index than that of the material of the terminations. The support members may be of a ceramic such as zirconia. The tubular passageway may be provided in a ceramic tube. The support members may be located in the tube from opposite ends. The support members preferably engage respective shoulders in the tubular passageway so that the ends of the support members are spaced from one another. The spherical terminations may be spaced from each other by a distance substantially equal to the diameter of a termination. The diameter of each recess at its larger end is preferably substantially equal to the diameter of the passageway. The diameter of the spherical terminations is preferably substantially three quarters the diameter of the recess at its larger end. The spherical terminations may project from the support members by a distance substantially one half the diameter of the terminations. The bore through the support member preferably has a diameter larger than that of the respective optical fibre, the layer of resilient material extending into the space between the fibre and the bore. The spherical terminations may be formed by melting the ends of the optical fibres. The reflective surface of the passageway may be provided by a layer of gold. The coupling preferably includes an O-ring seal which seals each support member with the tubular passageway.

A coupling for interconnecting two optical fibres, in accordance with the present invention, will now be described, by way of example, with reference to the accompanying drawing.

BRIEF DESCRIPTION OF THE DRAWING

The drawing is a sectional elevation of the coupling.

DESCRIPTION OF THE PREFERRED EMBODIMENTS

The coupling is of hermaphrodite form comprising a ceramic tube 1 with a recess 2 and 3 at each end which receives a respective male fitting 4 and 5 at the ends of respective single-fibre optical cables 14 and 15.

The tube 1 is of zirconia which has a low thermal coefficient of expansion closely matched to that of the glass of the optical fibres. Each recess 2 and 3 is in the form of a bore of circular section which extends about one third of the way along the tube 1 from opposite ends. Extending between the recesses 2 and 3, is a central tubular passageway 6 of circular section and of diameter slightly less than that of the recesses 2 and 3, so that respective internal annular steps 7 and 8 are formed at the inner ends of the recesses. The central tubular passageway 6 is plated with a layer 9 of gold or other material reflective to the radiation.

The male fittings 4 and 5 are identical so only one is described here. The fitting 4 is provided by a short zirconia support member or ferrule 40 of tubular shape which is secured to the end of the cable 14 by any conventional means. The ferrule 40 has a central axial bore 41 which is formed at its right-hand end with a frusto-conical recess 42 that flares outwardly to a large diameter which is approximately equal to the diameter of the central passageway 6 through the tube 1. The cable 14 has a single optical fibre 43 which extends through the bore 41 of the ferrule 40, the diameter of the fibre 43 being less than that of the bore 41 so that there is space formed between the fibre and the bore. At its end, the fibre 43 is formed into a spherical termination 44 which is 2–3 times the diameter of the fibre and larger than the diameter of the bore 41 but about ¾ the diameter of the largest part of the recess 42. The spherical termination 44 is preferably formed by melting the end of the fibre so that the surface tension of the molten material causes it to form a spherical shape. Techniques for forming spherical terminations to optical fibres have been described by G. Margheri and V. Russo in "Fiber to Fiber Connections for medium and high power Lasers", SPIE Vol 862 Optical Interconnections (1987) pp 124 to 130 and in a Briefing Paper "Fibre Optic Termination Process" published by ITT Cannon (UK) FOTP 4/87.

The male fitting 4 is completed by a layer of a transparent resilient adhesive 45 deposited in the surface of the frusto conical recess 42 and in at least the right hand end of the bore 41. The fibre 43 is pulled to the left so that the termination 44 squeezes the adhesive 45 before it is set and so that the termination forms an annular line of contact 46 with the recess 42. The adhesive 45 lies between the termination and the recess 42 and forms a seal between the fibre 43 and the ferrule 40. In this position, about one half of the spherical termination projects beyond the ferrule 40. The refractive index of the adhesive 45 is less than that of the material forming the termination 44 so that radiation incident on a termination/adhesive boundary is reflected back into the termination.

The male fitting 4 is pushed into the female recess 2 until the forward end of the ferrule 40 abuts the shoulder 7. An "O"-ring seal 24 around the ferrule 40 seals it with the recess 2. The male fitting 4 may be locked into the tube 1 by means of a metal clip, nut, adhesive or any other conventional means (not shown).

The other male fitting 5 is similarly fitted into the opposite male recess 3 so that the two terminations 44 and 55 are aligned with one another at opposite ends of the passageway 6. The length of the passageway 6 is selected so that the terminations 44 and 55 are spaced from one another by a distance approximately equal to the diameter of a termination.

Radiation emergent from the optical fibre 14 is focussed by the termination 44 onto the termination 55 in the other cable 15. Stray radiation is reflected by the reflective layer 9 lining the passageway 6 onto the opposite termination 55.

The engagement of the tapered surface of the recess with the spherical termination helps locate the terminations centrally and thereby ensures efficient radiation transfer between the two cables. The resilient adhesive provides a cushion between the optical fibres and their respective ferrules which accommodates, to a certain extent, any differential thermal expansion of the fibre relative to the coupling. The coupling is relatively easy to manufacture accurately and is easily cleaned, since both the male couplings can be removed from the central tube and the spherical ends easily wiped. The central tube is of low cost and can be readily replaced.

The coupling can also be used with optical fibres having a plastics sheath. In this application, the plastics sheath is simply stripped off over that region of the fibre inserted through the ferrule.

What I claim is:

1. In a coupling of the kind for interconnecting a first and second optical fibre, each fibre being providing with an enlarged termination of substantially spherical shape, the improvement wherein the coupling includes a first and second tubular support member, wherein each support member has a bore through which extends a respective one of the optical fibres, wherein the bore of each support member opens into a respective enlarged recess that flares outwardly towards the end of the support member and in which is seated a respective one of the enlarged terminations, wherein each support member has a layer of resilient material intermediate the recess and the termination, wherein the coupling includes a tubular passageway having a reflective surface, and wherein the support members are aligned with one another at opposite ends of the tubular passageway such that the terminations face one another and radiation transmitted from one optical fibre is focussed by its termination into the termination of the other optical fibre.

2. A coupling according to claim 1, wherein the recesses are of frusto-conical shape.

3. A coupling according to claim 1, wherein the resilient material is a transparent adhesive with a lower refractive index than that of the material of the termination.

4. A coupling according to claim 1, wherein the support members are of a ceramic.

5. A coupling according to claim 1, including a ceramic tube, and wherein the tubular passageway is provided in the ceramic tube.

6. A coupling according to claim 1, wherein the spherical terminations are spaced from each other by a distance substantially equal to the diameter of a termination.

7. A coupling according to claim 1, wherein the diameter of each recess at its larger end is substantially equal to the diameter of the passageway.

8. A coupling according to claim 1, wherein the diameter of the spherical terminations is substantially three quarters the diameter of the recess at its larger end.

9. A coupling according to claim 1, wherein the spherical terminations project from the support members by a distance substantially one half the diameter of the terminations.

10. A coupling according to claim 1, wherein the bore through the support member has a diameter larger than that of the respective optical fibre, and wherein the layer of resilient material extends into the space between the fibre and the bore.

* * * * *